US010535265B2

(12) United States Patent
Park et al.

(10) Patent No.: US 10,535,265 B2
(45) Date of Patent: Jan. 14, 2020

(54) APPARATUS AND METHOD FOR RECOGNIZING POSITION OF VEHICLE

(71) Applicant: HYUNDAI MOTOR COMPANY, Seoul (KR)

(72) Inventors: Jong Rok Park, Seoul (KR); Dong Gyu Noh, Dongducheon-si (KR); Su Lyun Sung, Anyang-si (KR); Tae Jun Lee, Gwangmyeong-si (KR); Cho Rong Ryu, Incheon (KR); Hahk Rel Noh, Bucheon-si (KR); Dae Sung Hwang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 334 days.

(21) Appl. No.: 15/581,519

(22) Filed: Apr. 28, 2017

(65) Prior Publication Data
US 2018/0151071 A1    May 31, 2018

(30) Foreign Application Priority Data

Nov. 30, 2016  (KR) .......................... 10-2016-0161922

(51) Int. Cl.
*G01G 1/16*  (2006.01)
*G01S 13/86*  (2006.01)
(Continued)

(52) U.S. Cl.
CPC ............ *G08G 1/161* (2013.01); *G01S 13/865* (2013.01); *G01S 13/867* (2013.01); *G01S 13/931* (2013.01);
(Continued)

(58) Field of Classification Search
CPC ........ G08G 1/161; G08G 1/163; G08G 1/166; G01S 13/865; G01S 13/867;
(Continued)

(56) References Cited

U.S. PATENT DOCUMENTS 4,552,456 A * 11/1985 Endo ....................... G01S 17/10
342/70
6,704,619 B1 * 3/2004 Coleman .............. G05D 1/0255
318/567
(Continued)

FOREIGN PATENT DOCUMENTS

KR         10-0806721 B1    2/2008
KR     10-2014-0064424 A    5/2014

*Primary Examiner* — Thomas E Worden
(74) *Attorney, Agent, or Firm* — Morgan, Lewis & Bockius LLP

(57) ABSTRACT

Disclosed are an apparatus and a method for recognizing a position of a vehicle. The apparatus includes a recognition unit that recognizes at least one first neighboring vehicle, a global positioning system (GPS) receiver that receives an absolute position of an own vehicle, a communication unit that transmits, to another vehicle, a relative position of the at least one first neighboring vehicle and the absolute position of the own vehicle and to receive, from the another vehicle, an absolute position of the another vehicle and a relative position of at least one second neighboring vehicle recognized by the another vehicle, and a processing unit that calculates the relative position of the at least one first neighboring vehicle, fuses relative positions of at least one third neighboring vehicle commonly recognized by the own vehicle and the another vehicle based on the relative position of the at least one first neighboring vehicle, the absolute position of the own vehicle, the absolute position of the another vehicle, and the relative position of the at least one second neighboring vehicle, and corrects an absolute position of at least one of the own vehicle, the another vehicle and the at least one third neighboring vehicle based on the fused relative position of the at least one third neighboring vehicle.

14 Claims, 12 Drawing Sheets

(51) Int. Cl.
*G01S 13/93* (2006.01)
*G01S 17/02* (2006.01)
*G01S 17/93* (2006.01)
*G01S 19/13* (2010.01)
*G08G 1/16* (2006.01)

(52) U.S. Cl.
CPC .......... *G01S 17/023* (2013.01); *G01S 17/936*
(2013.01); *G01S 19/13* (2013.01); *G08G 1/166*
(2013.01); *G01S 2013/9367* (2013.01)

(58) Field of Classification Search
CPC ...... G01S 13/931; G01S 17/023; G01S 17/10;
G01S 17/936; G01S 19/13; G01S
2013/936; G01S 2013/9367
See application file for complete search history.

(56) References Cited

U.S. PATENT DOCUMENTS

| | | | | |
|---|---|---|---|---|
| 9,079,662 | B1* | 7/2015 | Duffy | B64C 37/02 |
| 9,369,697 | B2* | 6/2016 | Kumagai | G01C 3/00 |
| 10,168,418 | B1* | 1/2019 | Al-Stouhi | G01S 15/931 |
| 2003/0125875 | A1* | 7/2003 | Lee | G01S 5/0072 |
| | | | | 701/472 |
| 2004/0070920 | A1* | 4/2004 | Flueli | G06F 9/4411 |
| | | | | 361/500 |
| 2008/0280625 | A1* | 11/2008 | Larsen | G01S 5/0226 |
| | | | | 455/456.1 |
| 2010/0164789 | A1* | 7/2010 | Basnayake | G01S 5/0072 |
| | | | | 342/357.23 |
| 2012/0271540 | A1* | 10/2012 | Miksa | G01C 21/30 |
| | | | | 701/409 |
| 2013/0279695 | A1* | 10/2013 | Rubin | G08G 9/02 |
| | | | | 380/255 |
| 2014/0297116 | A1* | 10/2014 | Anderson | H02K 5/12 |
| | | | | 701/37 |
| 2015/0073705 | A1* | 3/2015 | Hiwatashi | G01S 19/48 |
| | | | | 701/468 |
| 2016/0205656 | A1* | 7/2016 | Zeng | H04W 4/046 |
| | | | | 455/456.1 |
| 2016/0332624 | A1* | 11/2016 | Tezuka | B60W 30/16 |
| 2017/0176586 | A1* | 6/2017 | Johnson | G01C 17/38 |
| 2018/0160419 | A1* | 6/2018 | Jiang | G01S 5/0284 |
| 2018/0203130 | A1* | 7/2018 | Neubecker | G01S 19/05 |
| 2018/0247537 | A1* | 8/2018 | Oh | G05D 1/0293 |
| 2018/0357601 | A1* | 12/2018 | Jacobus | G06Q 10/087 |
| 2019/0005818 | A1* | 1/2019 | Altinger | G08G 1/096741 |
| 2019/0098471 | A1* | 3/2019 | Rech | G08G 1/162 |

* cited by examiner

| VEHICLE ID | ABSOLUTE POSITION (GPS INFORMATION) | SPEED | TRAVELING DIRECTION | SENSOR SENSING RANGE | RELATIVE POSITION OF NEIGHBORING VEHICLE #1 | RELATIVE POSITION OF NEIGHBORING VEHICLE #2 | ... | RELATIVE POSITION OF NEIGHBORING VEHICLE #N |
|---|---|---|---|---|---|---|---|---|
| | | | | | | | | |

FIG. 2

APPARATUS AND METHOD FOR RECOGNIZING POSITION OF VEHICLE

CROSS-REFERENCE TO RELATED APPLICATION

This application is based on and claims the benefit of priority to Korean Patent Application No. 10-2016-0161922, filed on Nov. 30, 2016, in the Korean Intellectual Property Office, the disclosure of which is incorporated herein in its entirety by reference.

TECHNICAL FIELD

The present disclosure relates to an apparatus and a method for recognizing a position of a vehicle, which are capable of accurately recognizing positions of an own vehicle and neighboring vehicles by exchanging sensor information with the neighboring vehicles through vehicle-to-everything (V2X) communication.

BACKGROUND

An advanced driver assistance systems (ADAS) is a system which is capable of preventing a safety accident from occurring by giving driving information or danger warning or through active intervention such that a driver drives more conveniently and safely.

Such an ADAS recognizes the positions and travelling states of neighboring vehicles by using at least one of a camera, a radar, and light detection and ranging (LiDAR) and gives warning to a driver to prevent an accident based on it in advance.

According to the related art, the performance of recognizing a forward vehicle through a sensor fusion technique using a heterogeneous sensor such as a camera, a radar and the like is advanced. However, although this may improve the recognition performance in the detectable range of a camera and a radar, it is difficult to improve the performance for a vehicle existing out of the detectable area.

In addition, a current V2X system estimates an absolute position of the own vehicle based on a global positioning system (GPS) and there is a limitation to correct the absolute position in any schemes except for a deduced reckoning (DR) scheme.

SUMMARY

The present disclosure has been made to solve the above-mentioned problems occurring in the prior art while advantages achieved by the prior art are maintained intact.

An aspect of the present disclosure provides an apparatus and a method for recognizing a position of a vehicle, which are capable of accurately recognizing positions of the own vehicle and neighboring vehicles by exchanging sensor information with the neighboring vehicles through vehicle-to-everything (V2X) communication.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, there is provides an apparatus for recognizing a position of a vehicle, which includes a recognition unit that recognizes at least one first neighboring vehicle, a global positioning system (GPS) receiver that receive an absolute position of an own vehicle, a communication unit that transmits, to another vehicle, a relative position of the at least one first neighboring vehicle and the absolute position of the own vehicle and to receive, from the another vehicle, an absolute position of the another vehicle and a relative position of at least one second neighboring vehicle recognized by the another vehicle, and a processing unit that calculates the relative position of the at least one first neighboring vehicle, fuses relative positions of at least one third neighboring vehicle commonly recognized by the own vehicle and the another vehicle based on the relative position of the at least one first neighboring vehicle, the absolute position of the own vehicle, the absolute position of the another vehicle, and the relative position of the at least one second neighboring vehicle, and corrects an absolute position of at least one of the own vehicle, the another vehicle and the at least one third neighboring vehicle based on the fused relative position of the at least one third neighboring vehicle.

The recognition unit may recognize the at least first neighboring vehicle by using a camera, a radar, and a light detection and ranging (LiDAR) device.

The processing unit may generate a vehicle-to-everything (V2X) message including the relative position of the at least one first neighboring vehicle and the absolute position of the own vehicle and transmits the V2X message to the another vehicle.

The V2X message further includes vehicle identification information, a vehicle speed, a vehicle travelling direction, and a sensor sensing range.

The processing unit may calculate a common sensor sensing range of the own vehicle and the another vehicle by using the absolute position, a travelling direction and a sensor sensing range of the own vehicle, and the absolute position, a travelling direction and a sensor sensing range of the another vehicle included in the V2X message received through V2X communication.

The at least one third neighboring vehicle may be commonly recognized in the common sensor sensing range by the own vehicle and the another vehicle.

The processing unit may compare an absolute position of at least one third neighboring vehicle recognized by the own vehicle and an absolute position of at least one third neighboring vehicle recognized by the another vehicle with each other, and may allow a relative position of the at least one third neighboring vehicle recognized by the own vehicle to overlap a relative position of the at least one third neighboring vehicle recognized by the another vehicle when the absolute position of the at least one third neighboring vehicle recognized by the own vehicle corresponds to the absolute position of the at least one third neighboring vehicle recognized by the another vehicle.

The processing unit may rotate a relative position of a remaining third neighboring vehicle recognized by the another vehicle about the overlapped relative position of the at least one third neighboring vehicle recognized by the another vehicle until a sum of distances between the relative positions of the at least one third neighboring vehicle recognized by the own vehicle and the relative positions of the at least one third neighboring vehicle recognized by the another vehicle is minimized, and may fuse the relative positions of the at least one third neighboring vehicle recognized by the own vehicle and the relative positions of the at least one third neighboring vehicle recognized by the another vehicle.

The processing unit may allow a relative position and an absolute position of a third neighboring vehicle corresponding to one of the fused relative positions of the at least one third neighboring vehicle to overlap each other, and may rotate an absolute position of a remaining third neighboring vehicle about the overlapped absolute position of the third neighboring vehicle until a sum of distances between the fused relative positions and absolute positions of the at least one third neighboring vehicle is minimized.

The processing unit may determine, in a preset range, a correction value by which the sum of the distances between the fused relative positions and absolute positions of the at least one third neighboring vehicle is minimized, and may correct the absolute position of at least one of the own vehicle, the another vehicle, and the at least one third neighboring vehicle, based on the correction value.

According to another aspect of the present disclosure, there is provides a method of recognizing a position of a vehicle, which includes calculating a relative position of at least one first neighboring vehicle recognized by an own vehicle, transmit, to another vehicle, the relative position of the at least one first neighboring vehicle and an absolute position of the own vehicle and receiving, from another vehicle, an absolute position of the another vehicle and a relative position of a second neighboring vehicle recognized by the another vehicle, fusing relative positions of at least one third neighboring vehicle commonly recognized by the own vehicle and the another vehicle based on the relative position of the first neighboring vehicle, the absolute position of the own vehicle, the absolute position of the another vehicle, and the relative position of the second neighboring vehicle, and correcting the absolute position of at least one of the own vehicle, the another vehicle and the third neighboring vehicle based on the fused relative positions of the at least one third neighboring vehicle.

The transmitting of the relative position of the first neighboring vehicle and the absolute position of the own vehicle and receiving the absolute position of the another vehicle and the relative position of the second neighboring vehicle includes: generating a vehicle-to-everything (V2X) message including the relative position of the at least one first neighboring vehicle and the absolute position of the own vehicle, transmitting the V2X message to the another vehicle, and receiving the V2X message including the absolute position of the another vehicle and the relative position of the at least one second neighboring vehicle transmitted from the another vehicle.

The V2X message may further include vehicle identification information, a vehicle speed, a vehicle travelling direction, and a sensor sensing range.

The fusing of the relative positions of the at least one third neighboring vehicle includes: calculating a common sensor sensing range of the own vehicle and the another vehicle based on the absolute position, a travelling direction and a sensor sensing range of the own vehicle, and the absolute position, a travelling direction and a sensor sensing range of the another vehicle, and fusing the relative position of the at least one third neighboring vehicle recognized in the common sensor sensing range by the own vehicle and the relative position of the at least one third neighboring vehicle recognized in the common sensor sensing range by the another vehicle.

The fusing of the relative positions of the at least one third neighboring vehicle recognized by the own vehicle and the relative position of the at least one third neighboring vehicle recognized by the another vehicle includes: comparing the absolute position of the at least one third neighboring vehicle recognized by the own vehicle and the absolute position of the at least one third neighboring vehicle recognized by the another vehicle with each other, after the comparing of the absolute positions, allowing the relative position of the third neighboring vehicle recognized by the own vehicle to overlap the relative position of the third neighboring vehicle recognized by the another vehicle, where the absolute position of the third neighboring vehicle recognized by the own vehicle corresponds to the absolute position of the third neighboring vehicle recognized by the another vehicle, rotating the relative position of a remaining third neighboring vehicle recognized by the another vehicle about the overlapped relative position of the third neighboring vehicle recognized by the another vehicle until a sum of distances between the relative positions of the at least one third neighboring vehicle recognized by the own vehicle and the relative positions of the at least one third neighboring vehicle recognized by the another vehicle is minimized, and after rotating the relative position of the remaining third neighboring vehicle recognized by the another vehicle, calculating a meddle between the relative position of the at least one third neighboring vehicle recognized by the own vehicle and the relative position of the at least one third neighboring vehicle recognized by the another vehicle as a fused relative position of the at least one third neighboring vehicle.

The correcting of the absolute position includes: allowing the fused relative position and the absolute position of one of the at least one third neighboring vehicle to overlap each other, rotating an absolute position of a remaining third neighboring vehicle about the overlapped absolute position of the third neighboring vehicle such that a sum of distances between the fused relative positions and the absolute positions of the at least one third neighboring vehicle is minimized, determining, in a preset range, a correction value by which the sum of the distances between the fused relative positions and the absolute positions of the at least one third neighboring vehicle is minimized, and correcting the absolute position of at least one of the own vehicle, the another vehicle, and the third neighboring vehicle, based on the correction value.

BRIEF DESCRIPTION OF THE DRAWINGS

The above and other objects, features and advantages of the present disclosure will be more apparent from the following detailed description taken in conjunction with the accompanying drawings:

FIG. 2 is a view illustrating a format of a V2X message according to an embodiment;

DETAILED DESCRIPTION

Throughout the specification, when some part 'comprises', 'includes' or 'has' some elements, unless explicitly described to the contrary, it means that other elements may be further included but not excluded.

In addition, the terms '-unit', '-or(er)', and 'module' described in the specification mean units for processing at least one function or operation, which can be implemented by hardware or software and any combination thereof. In addition, as used in the specification, the singular forms 'a', 'an', 'one', and 'the' are intended to include the plural forms as well unless the context clearly dictates otherwise or it is explicitly stated otherwise.

Hereinafter, embodiments of the present disclosure will be described in detail with reference to the accompanying drawings.

The present disclosure is to develop a technique of recognizing an own vehicle and a neighboring vehicle by exchanging information obtained through sensors between vehicles based on vehicle-to-everything (V2X).

Figure 1:
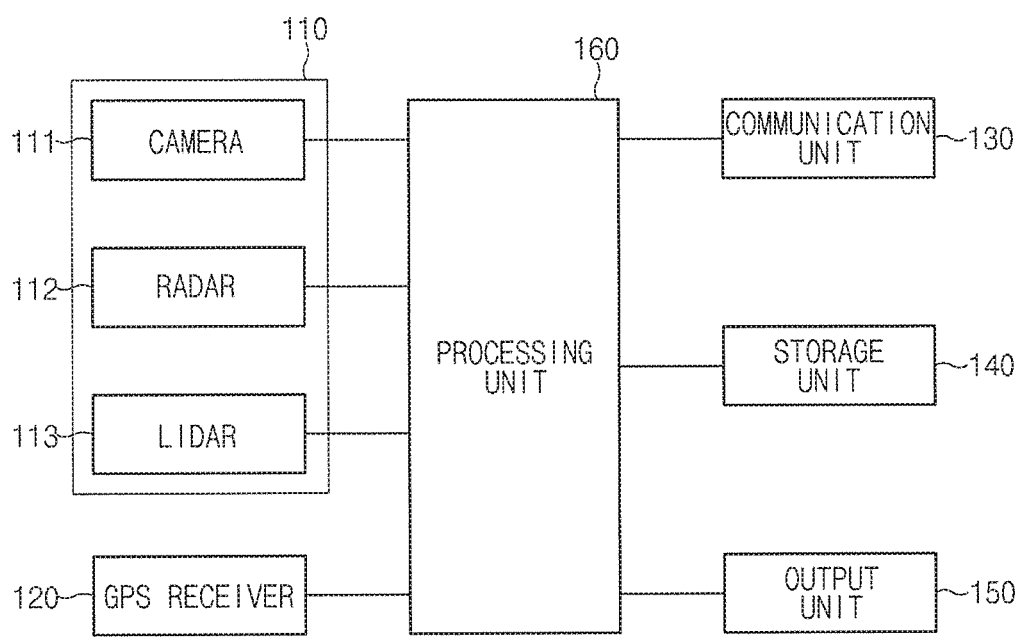
FIG. 1 is a block diagram illustrating an apparatus for recognizing a position of a vehicle according to an embodiment.

FIG. 1 is a block diagram illustrating an apparatus for recognizing a position of a vehicle according to an embodiment. FIG. 2 is a view illustrating a format of a V2X message according to an embodiment.

As shown in FIG. 1, an apparatus for recognizing a position of a vehicle includes a recognition unit 110, a global positioning system (GPS) receiver 120, a communication unit 130, a storage unit 140, an output unit 150, and a processing unit 160.

The recognition unit 110 recognizes a forward vehicle positioned in front of a vehicle. The recognition unit 110 may be implemented with an advanced driver assistance system (ADAS) sensor including a camera 111, a radar 112, and a light detection and ranging (LiDAR) 113. The camera 111, the radar 112, and the LiDAR 113 are installed at at least one of front, rear and side positions of a vehicle, respectively.

The camera 111 is installed to a vehicle to obtain a circumferential image. The camera 111 may be implemented with at least one of image sensors such as a charge-coupled device (CCD) image sensor, a complementary metal oxide semiconductor (CMOS) image sensor, a charge-priming device (CPD) image sensor, a charge injection device (CID) image sensor, and the like.

The camera 111 may include an image processor for performing image processing functions such as noise removal, color reproduction, image quality and saturation control, file compression, and the like for an image obtained through the image sensor.

The radar 112 measures a distance between the vehicle and a neighboring vehicle. The radar 112 may determine the distance, direction and altitude of an object by emitting electromagnetic waves to the object (neighboring vehicle) and receiving the electromagnetic waves reflected from the object.

The LiDAR 113 measures the distance between a vehicle and a neighboring vehicle. The LiDAR 113 injects a laser pulse and measures the time taken for the laser pulse to return from the object such that the spatial position coordinates of the reflection point are calculated, thereby determining a distance to the object and a shape of the object.

In this case, the neighboring vehicles represent vehicles located in front, rear and/or side of an own vehicle.

The GPS receiver 120 determines an absolute position of the vehicle by using signals transmitted from three GPS satellites or more. The GPS receiver 120 calculates a distance between a satellite and the GPS receiver 120 by using a difference between the signal transmission time of the satellite and signal reception time of the GPS receiver 120. The GPS receiver 120 calculates the absolute position by using the calculated distance between the satellite and the GPS receiver 120 and position information of the satellite included in the transmitted signal. The GPS receiver 120 calculates the absolute position by using triangulation.

The communication unit 130 wirelessly communicates with a neighboring vehicle and another vehicle. A V2X communication technique is utilized for the wireless communication. The communication unit 130 transmits information about the own vehicle and receives information about the neighboring vehicle transmitted from the neighboring vehicle under control of the processing unit 160.

The storage unit 140 may store a program for the operation of the processing unit 160 therein and may temporarily store input/output data. The storage unit 140 may store information about map data, and each specification and each sensor sensing range of sensors installed to the vehicle.

The storage unit 140 may be implemented with at least one of storage mediums such as a flash memory, a hard disk, a secure digital (SD) card, a random access memory (RAM), a read-only memory (ROM), a web storage, and the like.

The output unit 150 provided for outputting visual information, acoustic information and/or tactile information may include a display, an audio output module, a haptic module, etc. For example, the output unit 160 may display the absolute positions of an own vehicle, another vehicle and/or neighboring vehicles.

The display may include at least one of a liquid crystal display (LCD), a thin film transistor-liquid crystal display (TFT LCD), an organic light-emitting diode (OLED), a flexible display, a 3D display, a transparent display, a head-up display (HUD), a touchscreen.

The audio output module may output audio data stored in the storage unit 140. The audio output module may include a receiver, a speaker, and/or a buzzer.

The haptic module outputs a signal tactually recognizable by a user. For example, the haptic module may be implemented with a vibrator to control the vibration intensity and pattern.

The processing unit 160 calculates a relative position of at least one neighboring vehicle by using sensor data obtained through at least one sensor 111 to 113 installed to the own vehicle. The relative position includes longitudinal coordinate information and transverse coordinate information of neighboring vehicles based on the position (actual position) of the own vehicle.

The processing unit 160 determines the absolute position of the own vehicle through the GPS receiver 120. The processing unit 160 generates a V2X transmission message based on the information (own vehicle information) about the own vehicle obtained through the recognition unit 110 and the GPS receiver 120. The processing unit 160 transmits the generated V2X transmission message (V2X message) through the communication unit 130. In this case, as shown in FIG. 2, the V2X transmission message includes vehicle identification information (ID), an absolute position of a vehicle (GPS information), a vehicle speed, a vehicle travelling (heading) direction, sensor sensing ranges sensible by the sensors installed to a vehicle, a relative position of neighboring vehicle #N, and the like.

The processing unit 160 generates a V2X transmission message including an absolute position of the own vehicle and a relative position of at least one first neighboring vehicle recognized by the own vehicle and transmits the V2X transmission message to other vehicles and neighboring vehicles located in front, side and rear of the own vehicle.

In addition, the processing unit 160 receives a V2X reception message (V2X message) transmitted from another vehicle through the communication unit 130. The V2X reception message may include the absolute position of another vehicle, a relative position of at least one second neighboring vehicle recognized by the another vehicle, and a sensor sensing range sensible by the sensors installed to the another vehicle.

As described above, the own vehicle and the another vehicle share (exchange) the absolute position information of the own vehicle and the another vehicle and relative position information of at least one neighboring vehicle recognized by each vehicle with each other.

The processing unit 160 calculates a common sensor sensing range of the own vehicle and the another vehicle by using the absolute positions, the travelling (heading) directions and the sensor sensing ranges of the own vehicle and the another vehicle. The processing unit 160 calculates, as the common sensor sensing range, a common region of the sensor sensing ranges sensible by the sensors installed to the own vehicle and the sensors installed to the another vehicle. In this case, the processing unit 160 recognizes, as the another vehicle, one among the neighboring vehicles located near the own vehicle, of which the sensor sensing range of the sensors overlaps that of the sensors installed to the own vehicle. Although a case that only one vehicle have the same sensing range as that of the own vehicle has been described to enhance the disclosure understanding, the embodiment is not limited thereto, and two vehicles or more having the same sensor sensing range as that of the own vehicle may exist.

The processing unit 160 determines at least one third neighboring vehicle commonly recognized by the own vehicle and the another vehicle in the common sensor sensing range, as a target vehicle and fuses the relative position of the at least one target vehicle (third neighboring vehicle).

The processing unit 160 corrects the absolute position of each vehicle based on the fused relative position of the target vehicle. The processing unit 160 corrects an absolute position of at least one of the own vehicle, the neighboring vehicle and the another vehicle.

Figure 3:
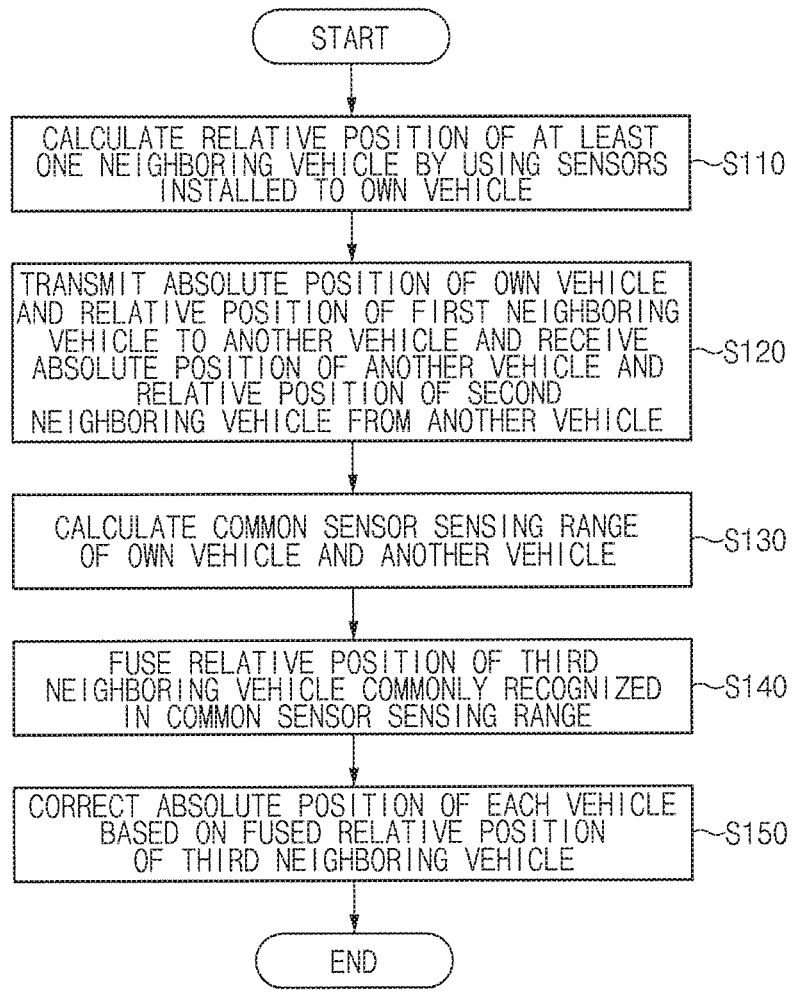
FIG. 3 is a flowchart illustrating a method of recognizing a position of a vehicle according to an embodiment.

FIG. 3 is a flowchart illustrating a method of recognizing a position of a vehicle according to an embodiment. FIG. 4A to 4E are views illustrating the method of recognizing a position of a vehicle shown in FIG. 3.

First, in step S110, the processing unit 160 calculates the relative position to the at least one neighboring vehicle by using the sensors installed to the own vehicle. The processing unit 160 calculates the relative position of each of the at least one first neighboring vehicle by using the data (the circumferential images and the distances between the own vehicle and the neighboring vehicles) obtained through the camera 111, the radar 112 and the LiDAR 113.

Figure 4A:
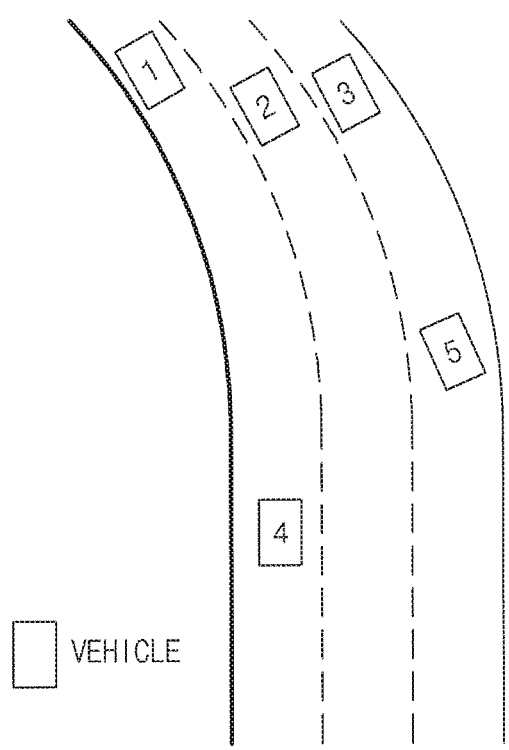
FIGS. 4A to 4E are views illustrating the method of recognizing a position of a vehicle shown in FIG. 3.
Figure 4B:
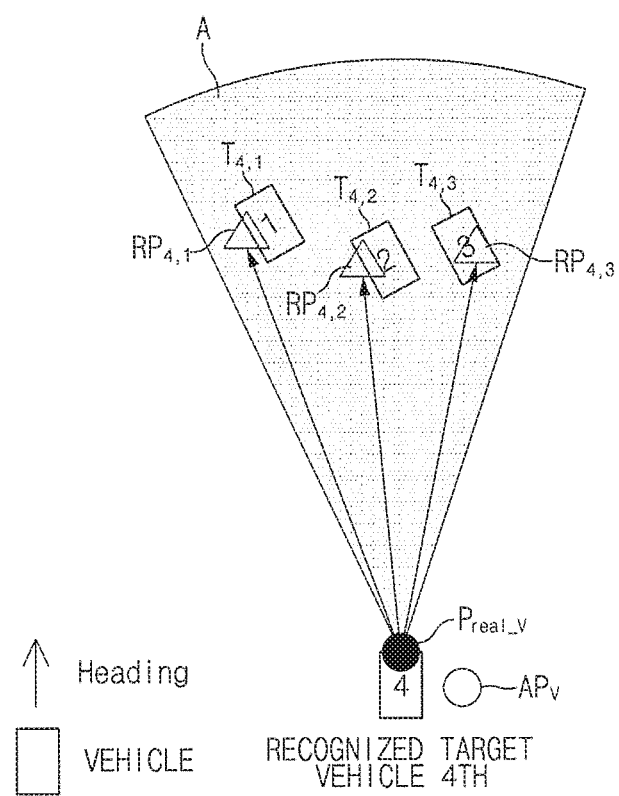

As shown in FIG. 4A, in a state that three vehicles 1 to 3 in front of the own vehicle 4 and another vehicle 5, as shown in FIG. 4B, the processing unit 160 of the own vehicle 4 calculates the relative positions $RP_{4,1}$, $RP_{4,2}$ and $RP_{4,3}$ of the first neighboring vehicles $T_{4,1}$, $T_{4,2}$ and $T_{4,3}$ based on the actual position $P_{real\_V}$ of the own vehicle by using the sensors installed to the own vehicle 4. In this case, since the another vehicle 5 is located out of the sensor sensing ranges of the neighboring vehicles and the own vehicle 4, the another vehicle 5 is not sensed by the sensors installed to the own vehicle 4. The processing unit 160 of the own vehicle 4 determines the absolute position $AP_V$ of the own vehicle 4 by using a GPS signal received through the GPS receiver 120.

Figure 4C:
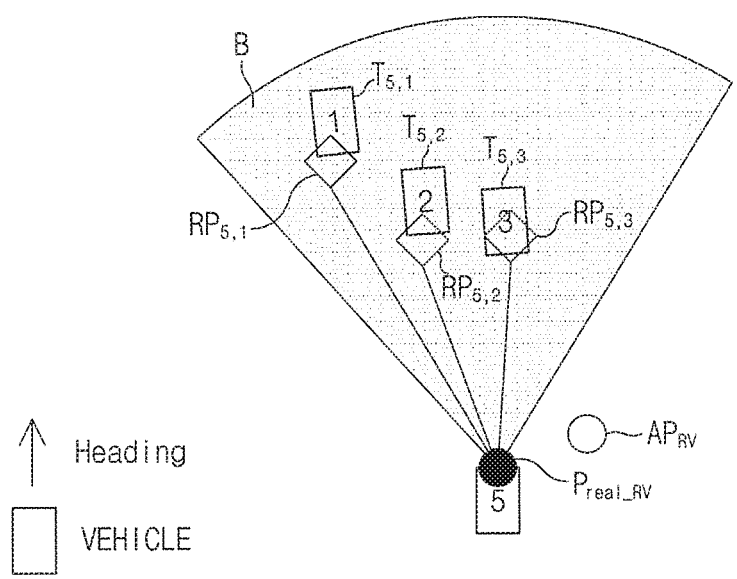

In addition, as shown in FIG. 4C, the processing unit 160 of the another vehicle 5 calculates the relative positions $RP_{5,1}$, $RP_{5,2}$ and $RP_{5,3}$ of the second neighboring vehicles $T_{5,1}$, $T_{5,2}$ and $T_{5,3}$ based on the actual position $P_{real\_RV}$ of the another vehicle 5 by using the sensors installed to the another vehicle 5. The processing unit 160 of the another vehicle 5 determines the absolute position $AP_{RV}$ of the another vehicle by using a GPS signal received through the GPS receiver 120. The processing units 160 of the own vehicle 4 and the another vehicle 5 may determine the speeds, the heading directions and the sizes of the own vehicle 4 and the another vehicle 5.

In step S120, the processing unit 160 transmits the absolute position of the own vehicle and the relative position of the at least one first neighboring vehicle recognized by the own vehicle to the another vehicle, and receives the absolute position of the another vehicle and the relative position of the at least one second neighboring vehicle recognized by the another vehicle from the another vehicle. In this case, the processing unit 160 determines the absolute position of the own vehicle through the GPS receiver 120. The processing unit 160 generates the V2X transmission message based on the absolute position of the own vehicle and the relative position of the at least one first neighboring vehicle. The processing unit 160 transmits the generated V2X transmission message to the another vehicle through the communication unit 130. In addition, the processing unit 160 receives the V2X reception message including the absolute position of the another vehicle and the relative position of the at least one second neighboring vehicle recognized by the another vehicle through the communication unit 130.

Figure 4D:
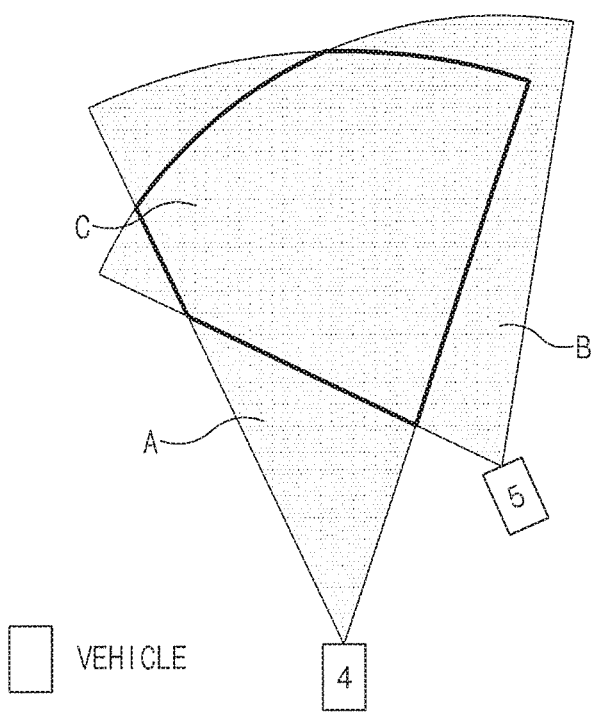

In step S130, the processing unit 160 calculates the common sensor sensing range of the own vehicle and the another vehicle based on information included in the V2X messages exchanged between the own vehicle and the another vehicle through the V2X communication. The processing unit 160 calculates the common sensor sensing range of the own vehicle and the another vehicle based on the absolute position, the travelling direction and the sensor sensing range of the own vehicle and the absolute position, the travelling direction and the sensor sensing range of the another vehicle. As shown in FIG. 4D, the processing unit 160 calculates, as the common sensor sensing range, a common region C between the sensor sensing range (region) A of the own vehicle and the sensor sensing range (region) B of the another vehicle.

In step S140, the processing unit 160 fuses the relative position of at least one third neighboring vehicle commonly recognized in the common sensor sensing range by the own vehicle and the another vehicle. The processing unit 160 determines at least one third neighboring vehicle commonly recognized by the own vehicle and the another vehicle in the common sensor sensing range as a target vehicle. In addition, the processing unit 160 fuses the relative position of at least one target vehicle (third neighboring vehicle).

Figure 4E:
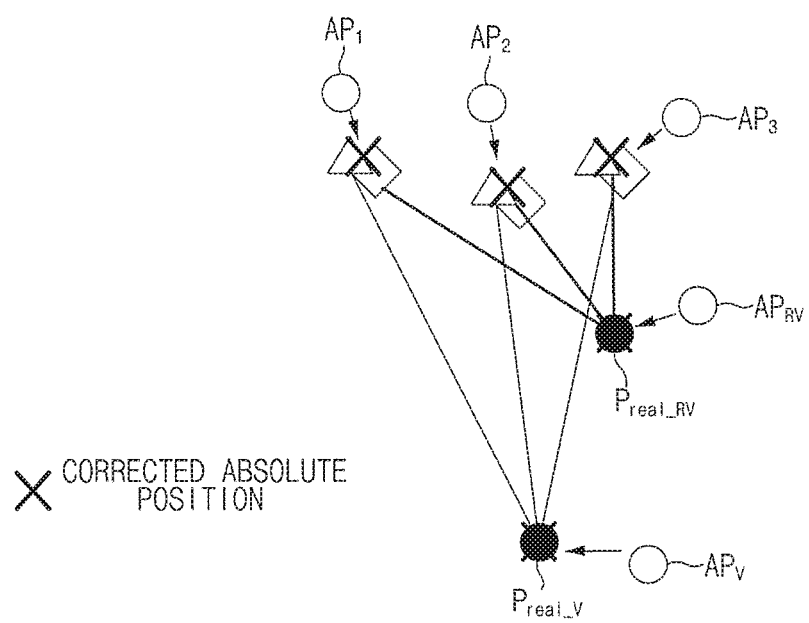

In step S150, the processing unit 160 corrects the absolute position of each vehicle based on the fused relative position of the at least one target vehicle. As shown in FIG. 4E, the processing unit 160 corrects the absolute positions of the own vehicle, the neighboring vehicle and the target vehicle (third neighboring vehicle), respectively.

Figure 5:
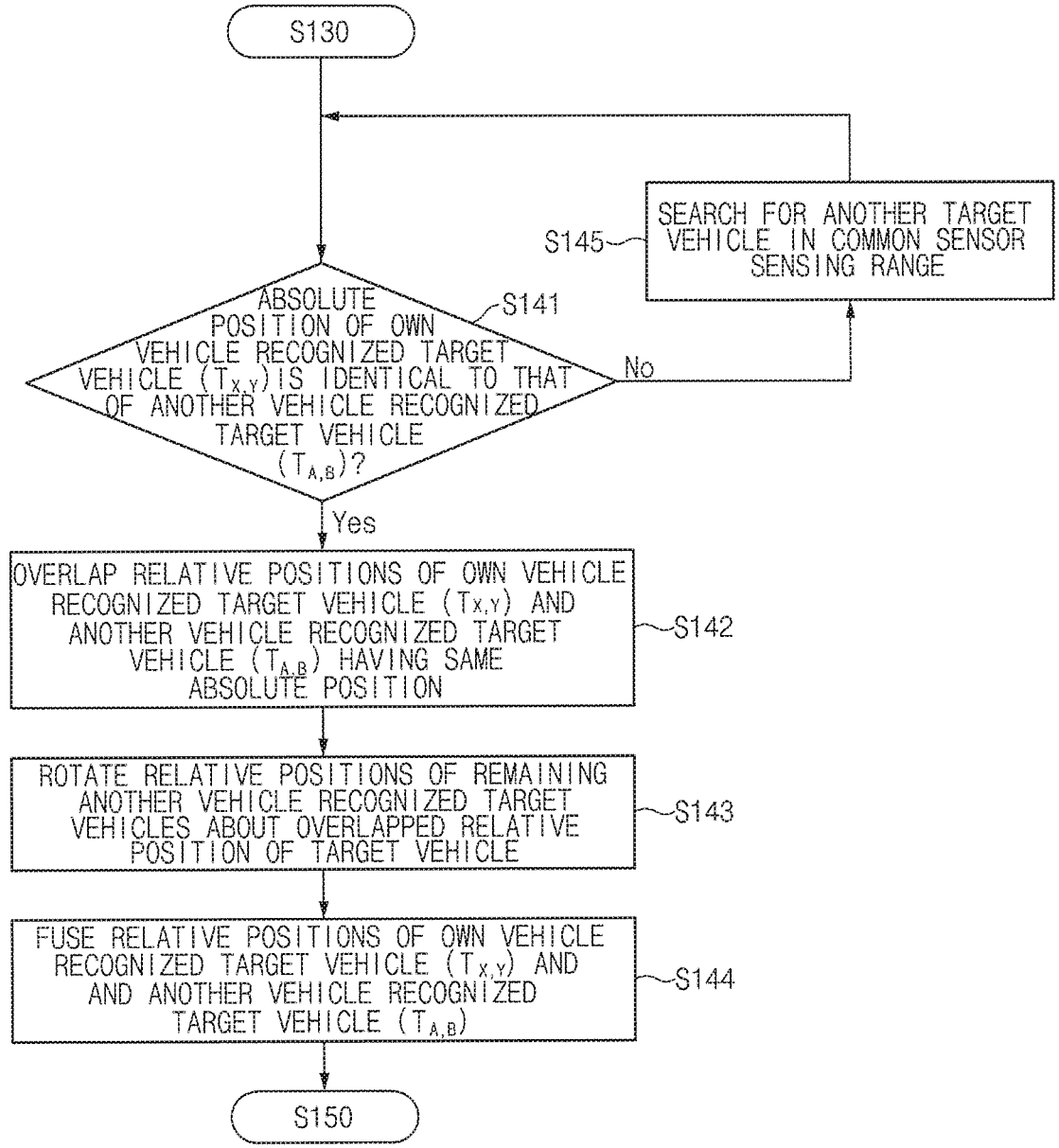
FIG. 5 is a flowchart illustrating the step of fusing a relative position of a target vehicle in a common sensor sensing range of FIG. 3.
Figure 6:
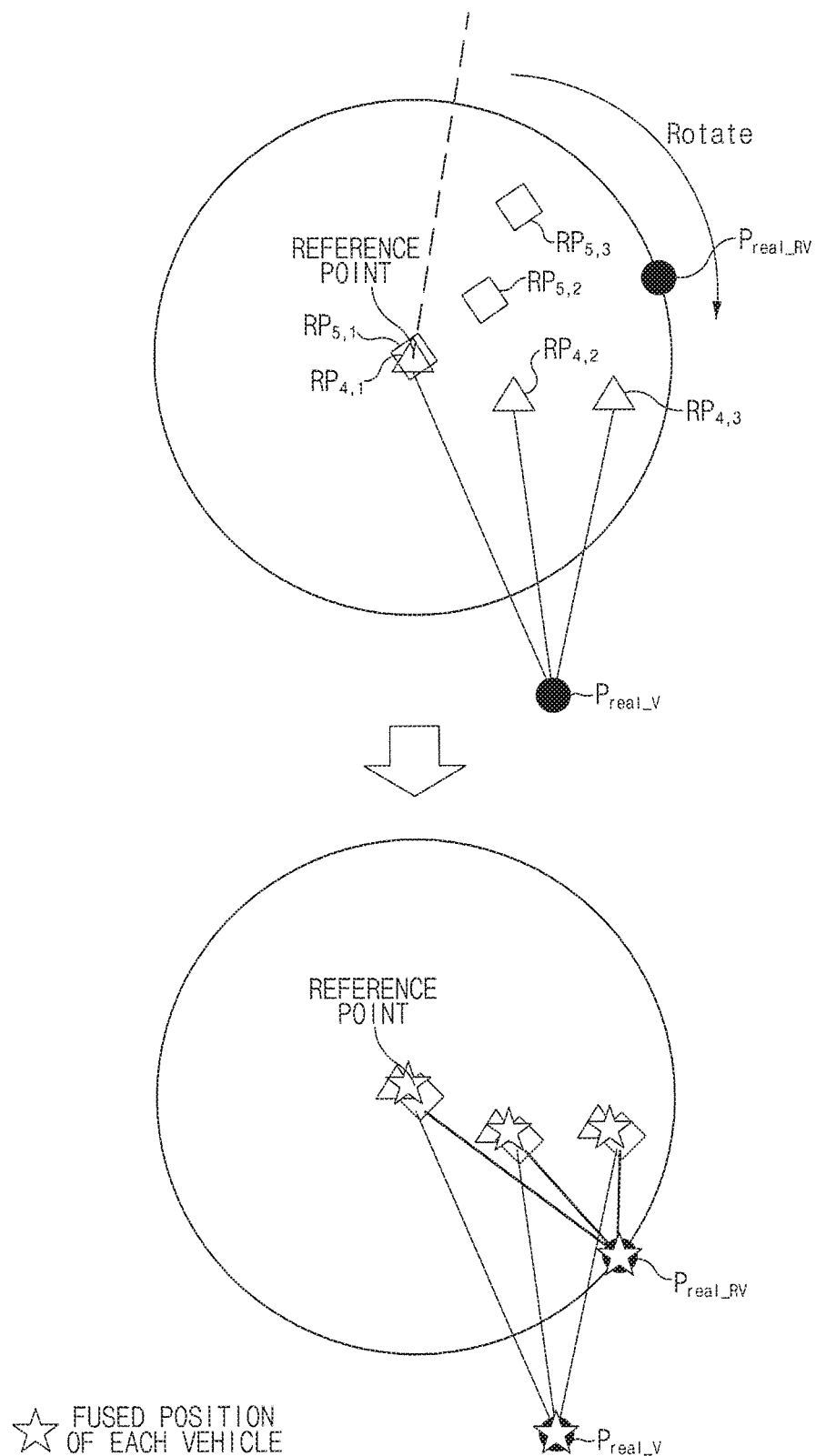
FIG. 6 is a view illustrating the fusing of a relative position of a target vehicle depicted in FIG. 5.

FIG. 5 is a flowchart illustrating the step of fusing a relative position of a target vehicle in a common sensor sensing range of FIG. 3. FIG. 6 is a view illustrating the fusing of a relative position of a target vehicle depicted in FIG. 5.

In step S141, the processing unit 160 confirms whether the absolute position of a target vehicle $T_{X,Y}$ recognized by the own vehicle in the common sensor sensing range is identical to that of a target vehicle $T_{A,B}$ recognized by the neighboring vehicle. The processing unit 160 calculates the absolute position of the target vehicle (hereinafter, referred to as "own vehicle recognized target vehicle") recognized by the own vehicle by using the absolute position of the own vehicle and the relative position of the own vehicle recognized target vehicle. In addition, the processing unit 160 calculates the absolute position of the target vehicle (hereinafter, referred to as "another vehicle recognized target vehicle") recognized by the another vehicle by using the absolute position of the another vehicle and the relative position of the another vehicle recognized target vehicle. The processing unit 160 confirms whether an another-vehicle recognized target vehicle, of which the absolute position is identical to that of one of at least one own vehicle recognized target vehicle in the common sensor sensing range, exists.

In step S142, when the absolute positions of the own vehicle recognized target vehicle $T_{X,Y}$ and the neighboring vehicle recognized target vehicle TAB are identical to each other, the processing unit 160 allows the relative position of the own vehicle recognized target vehicle $T_{X,Y}$ to overlap that of the neighboring vehicle recognized target vehicle TAB. As shown in FIG. 6, when the absolute positions of the own vehicle recognized target vehicle $T_{4,1}$ and the neighboring vehicle recognized target vehicle $T_{5,1}$ is identical to each other, the processing unit 160 allows the relative position $RP_{4,1}$ of the target vehicle $T_{4,1}$ to overlap the relative position $RP_{5,1}$ of the target vehicle $T_{5,1}$.

In step S143, the processing unit 160 rotates the actual position of the another vehicle and the relative position of the remaining another vehicle recognized target vehicle in one direction about the overlapped relative positions (reference point). As shown in FIG. 6, the processing unit 160 rotates the relative position $RP_{5,2}$ or $RP_{5,3}$ of the remaining other vehicle recognized target vehicle and the actual position $P_{real\_RV}$ of the another vehicle about the overlapped relative positions $RP_{4,1}$ and $RP_{5,1}$.

In this case, the processing unit 160 rotates the actual position of the another vehicle and the relative position of the remaining another vehicle recognized target vehicle except for the overlapped relative position of the another vehicle recognized target vehicle, such that a sum $(=|RP_{4,1}-RP_{5,1}|+|RP_{4,2}-RP_{5,2}|+|RP_{4,3}-RP_{5,3}|)$ of the distances between the relative positions of at least one own vehicle recognized target vehicle and the relative positions of at least one another vehicle recognized target vehicle is minimized.

In step S144, the processing unit 160 fuses the relative positions of the at least one own vehicle recognized target vehicle $T_{X,Y}$ and the at least one another vehicle recognized target vehicle $T_{A,B}$ in the state that the actual position of the another vehicle and the relative position of the remaining another vehicle recognized target vehicle are rotated such that the sum of the distances between the relative positions of at least one own vehicle recognized target vehicle and the relative positions of at least one another vehicle recognized target vehicle is minimized. In this case, the processing unit 160 determines the middle between the relative positions of the own vehicle recognized target vehicle and the another vehicle recognized target vehicle with respect to the same target vehicle as the fused relative position of the target vehicle commonly recognized by the own vehicle and the another vehicle.

Meanwhile, when the absolute positions of the own vehicle recognized target vehicle $T_{X,Y}$ and the another vehicle recognized target vehicle $T_{A,B}$ are not identical to each other in step S141, the processing unit 160 searches for another target vehicle in the common sensor sensing range in step S145. When the absolute positions of the own vehicle recognized target vehicle $T_{4,1}$ and the another vehicle recognized target vehicle $T_{5,1}$ are not identical to each other, the processing unit 160 compares the absolute positions of another own vehicle recognized target vehicle $T_{4,2}$ or $T_{4,3}$ and different another-vehicle recognized target vehicles $T_{5,2}$ and $T_{5,3}$ with each other to search for an own vehicle recognized target vehicle and an another-vehicle recognized target vehicle of which the absolute positions are identical to each other.

Figure 7:
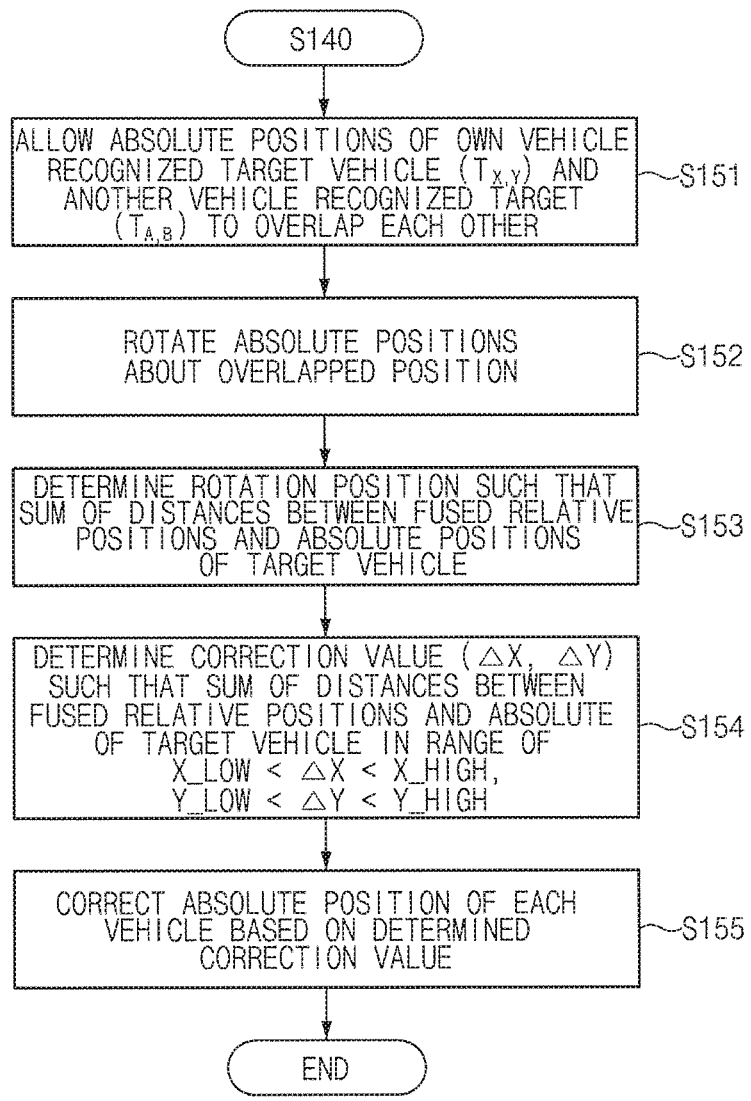
FIG. 7 is a flowchart illustrating a step of correcting an absolute position of each vehicle depicted in FIG. 3.
Figure 8:
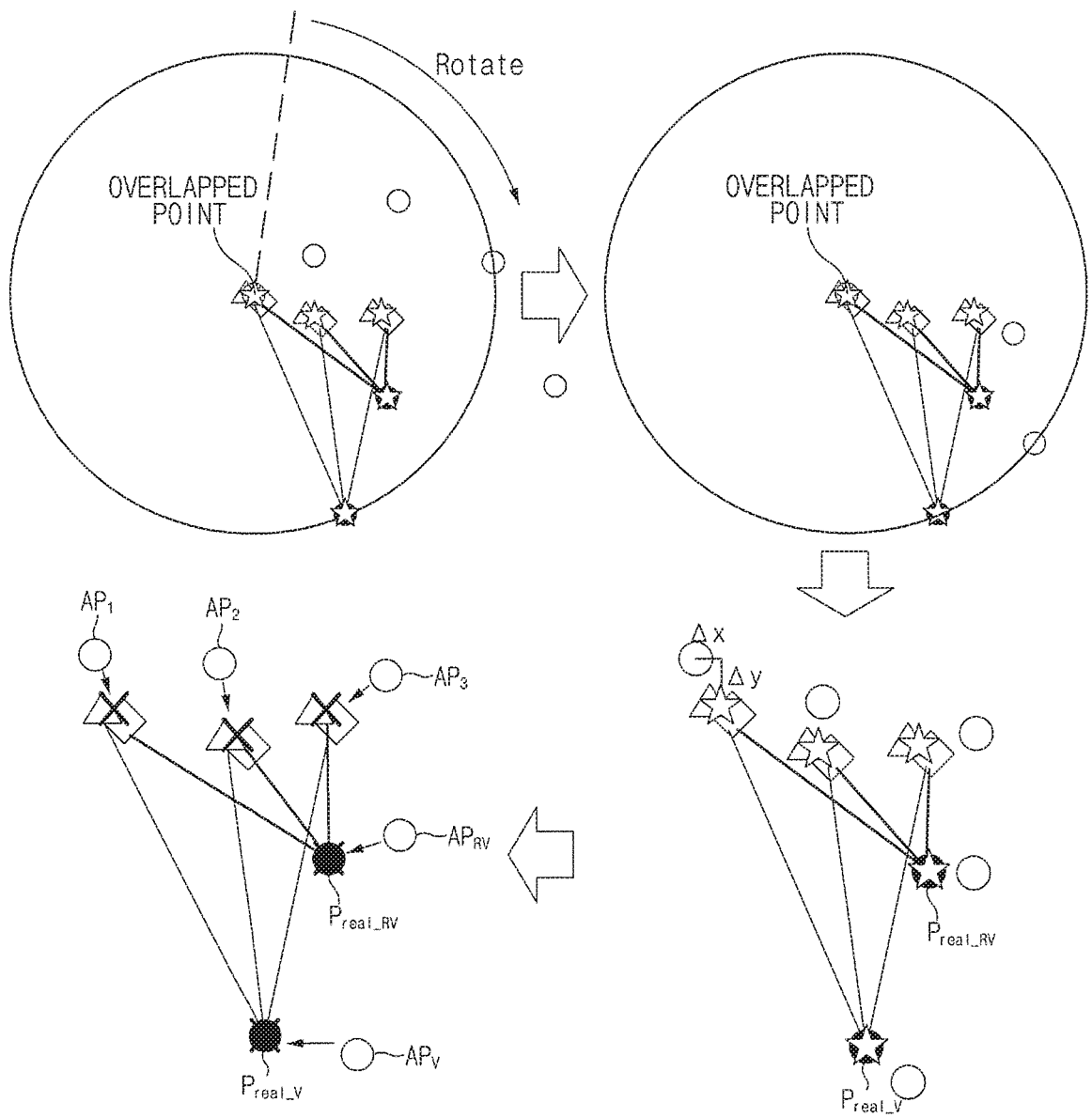
FIG. 8 is a view illustrating the sub-steps of the step of correcting an absolute position of each vehicle depicted in FIG. 7.

FIG. 7 is a flowchart illustrating a step of correcting an absolute position of each vehicle depicted in FIG. 3. FIG. 8 is a view illustrating the sub-steps of the step of correcting an absolute position of each vehicle depicted in FIG. 7.

In step S151, the processing unit 160 allows the fused relative position (the fused relative position of at least one target vehicle) and the absolute position of one of the at least one own vehicle recognized target vehicle $T_{X,Y}$ and the at least one another-vehicle recognized target vehicle $T_{A,B}$ to overlap each other. The processing unit 160 obtains the absolute position of the target vehicle from the neighboring vehicle corresponding to the target vehicle through the V2X communication. The processing unit 160 allows the fused relative position and the absolute position of the target vehicle (third neighboring vehicle) commonly recognized by the own vehicle and the another vehicle to overlap each other.

In step S152, the processing unit 160 rotates the absolute positions of remaining target vehicles (except for the overlapped absolute position of the target vehicle) about the overlapped position (overlapped point). The processing unit 160 together rotates the absolute positions of the own vehicle and the another vehicle.

In step S153, the processing unit 160 determines a rotation position at which the sum of the distances between the fused relative positions and the absolute positions of the target vehicles is minimized. As shown in FIG. 8, the processing unit 160 rotates the absolute positions of the target vehicles such that the sum of the distances between the fused relative positions and the absolute positions of the target vehicles is minimized.

In step S154, the processing unit 160 determines a correction value ($\Delta x$ and $\Delta y$) such that the sum of the distances between the fused relative positions and the absolute positions of the target vehicles is minimized in a preset range (x_low<$\Delta x$<x_high and y_low<$\Delta y$<y_high).

In step S155, the processing unit 160 corrects the absolute position of each vehicle based on the correction value (offset). The processing unit 160 corrects the absolute positions of the own vehicle, the target vehicle (third neighboring vehicle), and the another vehicle.

According to the present disclosure, the positions of an own vehicle and neighboring vehicles may be accurately recognized by exchanging sensor information with the neighboring vehicles by using the V2X.

In addition, according to the present disclosure, since the information about forward vehicles, which is estimated through the sensors installed to a vehicle, is exchanged through V2X messages such that the position of a forward vehicle is fused based on the information, the accuracy of the position of the forward vehicle may be improved and the accuracy of the relative positions between sensor-mounted vehicles may be improved.

In addition, the absolute positions of a vehicle and neighboring vehicles may be corrected based on the relative position information between the vehicles so that the accuracy is improved.

In addition, according to the present disclosure, the position of a neighboring vehicle located out of the area detectable with the sensor installed to an own vehicle may be accurately recognized.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure.

What is claimed is:

1. An apparatus for recognizing positions of a plurality of vehicles, the apparatus comprising:
    a sensor configured to recognize at least one first neighboring vehicle;
    a global positioning system (GPS) receiver configured to receive an absolute position of an own vehicle; and
    a processor configured to:
        transmit, to another vehicle, a relative position of the at least one first neighboring vehicle and the absolute position of the own vehicle,
        receive, from the another vehicle, an absolute position of the another vehicle and a relative position of at least one second neighboring vehicle recognized by the another vehicle,
        calculate the relative position of the at least one first neighboring vehicle,
        fuse relative positions of at least one third neighboring vehicle commonly recognized by the own vehicle and the another vehicle based on the relative position of the at least one first neighboring vehicle, the absolute position of the own vehicle, the absolute position of the another vehicle, and the relative position of the at least one second neighboring vehicle, and
        correct an absolute position of at least one of the own vehicle, the another vehicle, or the at least one third neighboring vehicle based on the fused relative position of the at least one third neighboring vehicle,
    wherein the processor calculates a common sensor sensing range of the own vehicle and the another vehicle by using the absolute position, a travelling direction, and a sensor sensing range of the own vehicle, and the absolute position, a travelling direction, and a sensor sensing range of the another vehicle included in a V2X message received through V2X communication.

2. The apparatus of claim 1, wherein the recognition unit sensor recognizes the at least one first neighboring vehicle by using a camera, a radar, and a light detection and ranging (LiDAR) device.

3. The apparatus of claim 1, wherein the processor generates a vehicle-to-everything (V2X) message comprising the relative position of the at least one first neighboring vehicle and the absolute position of the own vehicle, and transmits the V2X message to the another vehicle.

4. The apparatus of claim 3, wherein the V2X message further comprises vehicle identification information, a vehicle speed, a vehicle travelling direction, and a sensor sensing range.

5. The apparatus of claim 1, wherein the at least one third neighboring vehicle is commonly recognized in the common sensor sensing range by the own vehicle and the another vehicle.

6. The apparatus of claim 1, wherein the processor compares an absolute position of the at least one third neighboring vehicle recognized by the own vehicle and an absolute position of the at least one third neighboring vehicle recognized by the another vehicle with each other, and allows the relative position of the at least one third neighboring vehicle recognized by the own vehicle to overlap the relative position of the at least one third neighboring vehicle recognized by the another vehicle when the absolute position of the at least one third neighboring vehicle recognized by the own vehicle corresponds to the absolute position of the at least one third neighboring vehicle recognized by the another vehicle.

7. The apparatus of claim 6, wherein the processor rotates a relative position of the at least one third neighboring vehicle except the at least one third neighboring vehicle overlapping the relative position recognized by the another vehicle about the overlapped relative position of the at least one third neighboring vehicle recognized by the another vehicle until a sum of distances between the relative positions of the at least one third neighboring vehicle recognized by the own vehicle and the relative positions of the at least one third neighboring vehicle recognized by the another vehicle is minimized, and fuses the relative positions of the at least one third neighboring vehicle recognized by the own vehicle and the relative positions of the at least one third neighboring vehicle recognized by the another vehicle.

8. The apparatus of claim 7, wherein the processor allows a relative position and an absolute position of the at least one third neighboring vehicle corresponding to one of the fused relative positions of the at least one third neighboring vehicle to overlap each other, and rotates an absolute position of the at least one third neighboring vehicle except the at least one third neighboring vehicle overlapping the relative position and the absolute position about the overlapped absolute position of the at least one third neighboring vehicle until a sum of distances between the fused relative positions and absolute positions of the at least one third neighboring vehicle is minimized.

9. The apparatus of claim 8, wherein the processor determines, in a preset range, a correction value by which the sum of the distances between the fused relative positions and absolute positions of the at least one third neighboring vehicle is minimized, and corrects the absolute position of at least one of the own vehicle, the another vehicle, and the at least one third neighboring vehicle, based on the correction value.

10. A method of recognizing positions of a plurality of vehicles, the method comprising:
- calculating a relative position of at least one first neighboring vehicle recognized by an own vehicle;
- transmit, to another vehicle, the relative position of the at least one first neighboring vehicle and an absolute position of the own vehicle and receiving, from the another vehicle, an absolute position of the another vehicle and a relative position of a second neighboring vehicle recognized by the another vehicle;
- fusing relative positions of at, least one third neighboring vehicle commonly recognized by the own vehicle and the another vehicle based on the relative position of the at least one first neighboring vehicle, the absolute position of the own vehicle, the absolute position of the another vehicle, and the relative position of the second neighboring vehicle; and
- correcting the absolute position of at least one of the own vehicle, the another vehicle, and the at least one third neighboring vehicle based on the fused relative positions of the at least one third neighboring vehicle,
- wherein the fusing of the relative positions of the at least one third neighboring vehicle comprises:
- calculating a common sensor sensing range of the own vehicle and the another vehicle based on the absolute position, a travelling direction, and a sensor sensing range of the own vehicle, and the absolute position, a travelling direction, and a sensor sensing range of the another vehicle; and
- fusing the relative position of the at least one third neighboring vehicle recognized in the common sensor sensing range by the own vehicle and the relative position of the at least one third neighboring vehicle recognized in the common sensor sensing range by the another vehicle.

11. The method of claim 10, wherein the transmitting of the relative position of the at least one first neighboring vehicle and the absolute position of the own vehicle and receiving the absolute position of the another vehicle and the relative position of the second neighboring vehicle comprises:
- generating a vehicle-to-everything (V2X) message comprising the relative position of the at least one first neighboring vehicle and the absolute position of the own vehicle;
- transmitting the V2X message to the another vehicle; and
- receiving the V2X message comprising the absolute position of the another vehicle and the relative position of the at least one second neighboring vehicle transmitted from the another vehicle.

12. The method of claim 11, wherein the V2X message further comprises vehicle identification information, a vehicle speed, a vehicle travelling direction, and a sensor sensing range.

13. The method of claim 10, wherein the fusing of the relative positions of the at least one third neighboring vehicle recognized by the own vehicle and the relative position of the at least one third neighboring vehicle recognized by the another vehicle comprises:
- comparing the absolute position of the at least one third neighboring vehicle recognized by the own vehicle and the absolute position of the at least one third neighboring vehicle recognized by the another vehicle with each other;
- after the comparing of the absolute positions, allowing the relative position of the at least one third neighboring vehicle recognized by the own vehicle to overlap the relative position of the at least one third neighboring vehicle recognized by the another vehicle, where the absolute position of the at least one third neighboring vehicle recognized by the own vehicle corresponds to the absolute position of the at least one third neighboring vehicle recognized by the another vehicle;
- rotating the relative position of the at least one third neighboring vehicle recognized by the another vehicle about the overlapped relative position of the third neighboring vehicle recognized by the another vehicle until a sum of distances between the relative positions of the at least one third neighboring vehicle recognized by the own vehicle and the relative positions of the at least one third neighboring vehicle recognized by the another vehicle is minimized; and
- after rotating the relative position of the at least one third neighboring vehicle except the at least one third neighboring vehicle overlapping the relative position recognized by the another vehicle, calculating a middle between the relative position of the at least one third neighboring vehicle recognized by the own vehicle and the relative position of the at least one third neighboring vehicle recognized by the another vehicle as a fused relative position of the at least one third neighboring vehicle.

14. The method of claim 13, wherein the correcting of the absolute position comprises:
- allowing, the fused relative position and the absolute position of one of the at least one third neighboring vehicle to overlap each other;
- rotating an absolute position of the at least one third neighboring vehicle except the at least one third neighboring vehicle overlapping the relative position and the absolute position about the overlapped absolute position of the at least one third neighboring vehicle such that a sum of distances between the fused relative positions and the absolute positions of the at least one third neighboring vehicle is minimized;
- determining, in a preset range, a correction value by which the sum of the distances between the fused relative positions and the absolute positions of the at least one third neighboring vehicle is minimized; and
- correcting the absolute position of at least one of the own vehicle, the another vehicle, and the at least one third neighboring vehicle, based on the correction value.

* * * * *